US010753708B2

(12) United States Patent
Naftel (10) Patent No.: US 10,753,708 B2
(45) Date of Patent: Aug. 25, 2020

(54) MISSILE TARGETING (71) Applicant: MBDA UK Limited, Stevenage, Hertfordshire (GB)

(72) Inventor: Andrew James Naftel, Bristol (GB)

(73) Assignee: MBDA UK Limited, Stevenage, Hertfordshire (GB)

( * ) Notice: Subject to any disclaimer, the term of this patent is extended or adjusted under 35 U.S.C. 154(b) by 147 days.

(21) Appl. No.: 15/768,103

(22) PCT Filed: Oct. 17, 2016

(86) PCT No.: PCT/GB2016/053208
§ 371 (c)(1),
(2) Date: Apr. 13, 2018

(87) PCT Pub. No.: WO2017/068331
PCT Pub. Date: Apr. 27, 2017

(65) Prior Publication Data
US 2018/0299228 A1 Oct. 18, 2018

(30) Foreign Application Priority Data

Oct. 20, 2015 (EP) .................................... 15275218
Oct. 20, 2015 (GB) .................................. 1518553.1

(51) Int. Cl.
*F41G 7/22* (2006.01)
*G01C 11/08* (2006.01)
(Continued)

(52) U.S. Cl.
CPC ........... *F41G 7/2226* (2013.01); *F41G 7/007* (2013.01); *F41G 7/2253* (2013.01);
(Continued)

(58) Field of Classification Search
CPC ...... F41G 7/2226; F41G 7/007; F41G 7/2293; G06K 9/2018; G06K 9/2027; G06K 9/22;
(Continued)

(56) References Cited

U.S. PATENT DOCUMENTS 6,711,293 B1  3/2004 Lowe
7,397,970 B2  7/2008 Han et al.
(Continued)

FOREIGN PATENT DOCUMENTS

| EP | 2060873 A2 | 5/2009 |
| EP | 2816310 A2 | 12/2014 |
| FR | 2973896 A1 | 10/2012 |
| GB | 2489829 A | 10/2012 |

OTHER PUBLICATIONS ntemational Preliminary Report on Patentability and Written Opinion dated May 3, 2018 from related PCT/GB2016/053208.
(Continued)

*Primary Examiner* — Leon Flores
(74) *Attorney, Agent, or Firm* — Scully, Scott, Murphy & Presser, P.C.

(57) ABSTRACT

A method of targeting a missile. A plurality of images of a target, taken from a plurality of viewpoints, are received. Features in the images characteristic of the target are identified. Data representing the characteristic features are provided to the missile to enable the missile to identify, using the characteristic features, the target in images of the environment of the missile obtained from an imager included in the missile.

21 Claims, 3 Drawing Sheets

(51) Int. Cl.
*F41G 7/00* (2006.01)
*G06T 7/73* (2017.01)
*G06K 9/62* (2006.01)
*G06K 9/20* (2006.01)
*G06K 9/46* (2006.01)
*G06K 9/32* (2006.01)
*G06K 9/22* (2006.01)

(52) U.S. Cl.
CPC ............ *F41G 7/2293* (2013.01); *G01C 11/08* (2013.01); *G06K 9/2018* (2013.01); *G06K 9/2027* (2013.01); *G06K 9/22* (2013.01); *G06K 9/3241* (2013.01); *G06K 9/4671* (2013.01); *G06K 9/6218* (2013.01); *G06T 7/73* (2017.01); *G06K 2209/21* (2013.01); *G06T 2207/30212* (2013.01)

(58) Field of Classification Search
CPC .. G06K 9/3241; G06K 9/4671; G06K 9/6218; G06T 7/73; G01C 11/08
See application file for complete search history.

(56) References Cited

U.S. PATENT DOCUMENTS

| | | |
|---|---|---|
| 8,401,276 B1 | 3/2013 | Choe et al. |
| 2005/0271248 A1 | 12/2005 | Teku et al. |
| 2008/0012751 A1* | 1/2008 | Owens ................... F41G 7/226 342/62 |
| 2011/0261162 A1 | 10/2011 | Holicki et al. |
| 2013/0004086 A1 | 1/2013 | Carlbom et al. |
| 2015/0146015 A1 | 5/2015 | Sommerlade et al. |

OTHER PUBLICATIONS

International Search Report dated Jan. 4, 2017 issued in PCT/GB2016/053208.
European Search Report dated Mar. 31, 2016 issued in EP 15275218.
GB Search Report dated May 18, 2016 issued in GB 15185511.
English Abstract of GB 2489829 A dated Oct. 10, 2012.

\* cited by examiner

Fig. 1

MISSILE TARGETING

FIELD OF THE INVENTION

This invention relates to the field of missile targeting. The invention relates in particular to apparatus and methods for identifying a target for a guided or homing missile.

BACKGROUND ART

Several different ways of identifying a target for a guided or homing missile are known in the art. A simple approach is to provide the missile with a location of the target, known from intelligence reports, surveillance imagery or other surveillance activity or from public sources. The missile is then guided to that location, typically in modern systems using its own onboard guidance systems, inertial and/or satellite-based. However, that approach is limited to targets that are fixed, or at least reliably known to be in a particular location at a particular time. Even in those cases, targeting can be relatively coarse, at least for small, locally mobile targets, delivering the missile only to the approximate location of the target. Moreover, if the intelligence reports or other sources prove to be inaccurate, or out-of-date, the missile is delivered to a location from which the target has left or where it has never been. Another common approach, particularly for relatively short-range missiles, is to aim the missile towards the target and to rely on radar or ladar for guidance to the target in the final phase of flight. That approach is adequate in situations in which significant returns to the radar or ladar are from the target and no other objects, or from several objects all of which are targets, but it is not good when a target is surrounded by other objects that provide strong returns.

Although guidance to a specified location remains useful in getting the missile to the vicinity of the target, more precise missile targeting to a specific target usually requires control by a human having visual contact with the target. For example, in semi-active laser targeting, a person with a direct line-of-sight to the target illuminates it with a laser of a preselected wavelength. The incoming missile includes a sensor, typically a quadrant sensor, which detects reflections of the laser wavelength from the target and the missile steers itself towards the source of those reflections. In another example, the missile includes an onboard camera or other imaging system, which relays images, from the missile in flight, to a remote human operator, whether in an aircraft or on the ground. The operator reviews the images and identifies the target. The operator then either steers the missile to the target or provides sufficient information to the missile for it to lock onto the target and steer itself towards it. In a variant of this approach, the images are provided by a camera or other imaging system on board an ISTAR-UAV circling the target or operated by a human on the ground.

However, human intervention in the targeting process—an "operator in the loop"—has many drawbacks. In the case of semi-active laser targeting, for example, the operator is required to have a line-of-sight to the target until close to the moment of detonation of the missile. Clearly, that is potentially extremely hazardous for the operator. Even where the operator is remote, communication delays and interruptions can cause problems. The operator must be trained to be sufficiently skilled in target recognition and remain vigilant in his or her monitoring of the images. There is a significant risk of error.

In recent years, there has therefore been much interest in automatic targeting of missiles to specific targets. For example, it is known to provide a missile with image processing software including a database of target shapes, so that images provided by the missile's imaging system are processed and matches to the target shape, if any, are identified. As space and power on board a missile are limited, a more common approach is to provide the image processing software to the remote human operator, so that the images are pre-processed before they are presented to the operator. Specifically, the image-processing software identifies objects in the images that are possible matches to the target shapes in the database, and highlights those objects in the images presented to the operator. That helps the operator to spot potential targets, but the final identification and designation of an object as a target is by the operator.

In another variant, images of the target are provided to the missile by an ISTAR-UAV, human on the ground, or other source, and image processing software on board the missile looks for objects in an image stream from the missile's own camera that match the image provided to the missile. This approach can require significant bandwidth between the source of images and the missile, which is often not available, and may still require an operator in the loop to make final targeting decisions, as described above.

A further difficulty is that missiles usually have only limited on-board resources, for example processors and power supplies, and so resource-intensive processes (e.g. complex image processing) are not possible.

It would be advantageous to provide improved apparatus and methods of missile targeting in which the above-described disadvantages are eliminated or at least ameliorated.

SUMMARY

Briefly and in general terms, the present invention provides apparatus directed towards improving targeting of missiles by comparing characteristic features of the target and the image in the field of view of the seeker.

The invention provides, in a first aspect, a method of targeting a missile, the method comprising:

receiving a plurality of images of a target taken from a plurality of viewpoints;

identifying in the images features characteristic of the target;

providing data representing the characteristic features to the missile to enable the missile to identify, using the characteristic features, the target in images of the environment of the missile obtained from an imager included in the missile.

The invention also provides, in a second aspect, a method of targeting a missile, the method comprising:

causing the missile to receive data representing features characteristic of a target, the characteristic features having been identified in a plurality of images of the target taken from a plurality of viewpoints;

the missile identifying, using the characteristic features, the target in images of the environment of the missile obtained from an imager included in the missile.

The invention also provides, in a third aspect, a missile comprising:

a telecommunications receiver for receiving data representing features characteristic of a target, the characteristic features having been identified in a plurality of images of the target taken from a plurality of viewpoints;

an imager for obtaining images of the environment of the missile;

a data processor configured to identify, using the characteristic features, the target in images of the environment of the missile obtained from the imager.

It will be appreciated that features described in relation to one aspect of the present invention can be incorporated into other aspects of the present invention. For example, an apparatus of the invention can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Example embodiments of the invention will now be described by way of example only and with reference to the accompanying drawings, of which.

For convenience and economy, the same reference numerals are used in different figures to label identical or similar elements of the engines shown.

DETAILED DESCRIPTION

Embodiments are described herein in the context of approaches to improve methods of targeting missiles.

Those of ordinary skill in the art will realise that the following detailed description is illustrative only and is not intended to be in any way limiting. Other embodiments of the present invention will readily suggest themselves to such skilled persons having the benefit of this disclosure. Reference will be made in detail to implementations as illustrated in the accompanying drawings.

As previously stated, the first aspect is directed to a method of targeting a missile. A plurality of images of a target, taken from a plurality of viewpoints, are received. Features characteristic of the target are identified in the images. Data representing the characteristic features are provided to the missile to enable the missile to identify, using the characteristic features, the target in images of the environment of the missile obtained from an imager included in the missile.

The method may include the step of collecting the images of the target. The images may be collected using, for example, a hand-held camera or mobile phone. The plurality of viewpoints may be overlapping viewpoints.

It may be that the features that are characteristic of the target are regions of the target in which in the image of the target provide a rapid change in contrast, that is, a change in contrast greater than a selected threshold value. It may be that the features that are characteristic of the target are corner regions of the target. It may be that features that are characteristic of the target are identified using a scale-invariant feature transform (SIFT) algorithm.

The identification of the characteristic features may include the step of generating rescaled versions of at least one of the images of the target. The rescaling may, for example, be achieved by deleting or multiplying pixels.

The identification of the characteristic features may include the step of smoothing the rescaled image versions. The smoothing may be carried out using a Gaussian kernel.

The identification of the characteristic features may include the step of calculating difference images between the smoothed, rescaled image versions. The difference images may be calculated by taking the Difference of Gaussians between the smoothed, rescaled image versions.

The identification of the characteristic features may include the step of finding extrema in the difference images.

The identification of the characteristic features may include the step of assigning an orientation to each extremum. The orientation may be assigned to the extremum using gradients in the greyscale value of pixels in the difference images.

The identification of the characteristic features may include the step of generating a vector describing the extrema, for example comprising the orientation of the extrema.

The method may include the step of matching characteristic features across two or more of the plurality of images. The matching may include the step of calculating a distance, for example a Gaussian-weighted Euclidean distance, between characteristic features being matched. It may be that the matching is carried out pairwise between all of the characteristic features in a first of the plurality of images and all of the characteristic features in a second of the plurality of images (i.e. every characteristic feature in the first image is matched with every characteristic feature in the second image). The matching may include assessing the quality of the match against a statistical significance test. The matching may include assessing the quality of the match by calculating the best fit similarity transform between characteristic features in a first of the plurality of images and characteristic features in a second of the plurality of images. The similarity transform may be a translation of the centroid of the characteristic features in the respective images, a rescaling of the characteristic features in the respective images, or a rotation of the characteristic features in the respective images, or a combination of all three.

The method may include the step of forming a view cluster including characteristic features from two or more of the corresponding images. The view cluster may be formed by selecting a reference image and one or more other images from the plurality of images, matching characteristic features in the other image(s) to characteristic features in the reference image, and adding to the reference image further, unmatched, characteristic features from the other image(s) that have not been previously identified as characteristic features in the reference image.

The method may include the step of creating a model of the target from the characteristic features in the view clusters.

The imager included in the missile may be a seeker.

The method may include the step of identifying features characteristic of the target in the images of the environment of the missile. The method may include the step of matching the characteristic features in the images of the environment of the missile to characteristic features in the view clusters or target model. The matching may include the step of calculating a distance, for example a Gaussian-weighted Euclidean distance, between characteristic features being matched. It may be that the matching is carried out pairwise between all of the characteristic features in the images of the environment of the missile and all of the characteristic features in the view clusters or target model. The matching may include assessing the quality of the match against a statistical significance test. The matching may include assessing the quality of the match by calculating the best fit similarity transform between characteristic features in the images of the environment of the missile and characteristic features in one or more images of the target or view clusters or a target model. The similarity transform may be a translation of the centroid of the characteristic features in the respective images, a rescaling of the characteristic features in the respective images, or a rotation of the characteristic features in the respective images, or a combination of all three.

The method may include the step of estimating the location and pose of the target in the images of the environment of the missile.

As previously stated, the second aspect is directed to a method of targeting a missile. The missile is caused to receive data representing identifying features characteristic of a target, the identifying features having been identified in a plurality of images of the target taken from a plurality of viewpoints. The missile identifies, using the identifying features, the target in images of the environment of the missile obtained from an imager included in the missile.

As previously stated, the third aspect is directed to a missile. The missile comprises a telecommunications receiver for receiving data representing identifying features characteristic of a target, the identifying features having been identified in a plurality of images of the target taken from a plurality of viewpoints. The missile comprises an imager for obtaining images of the environment of the missile. The missile comprises a data processor configured to identify, using the identifying features, the target in images of the environment of the missile obtained from the imager.

Figure 1:
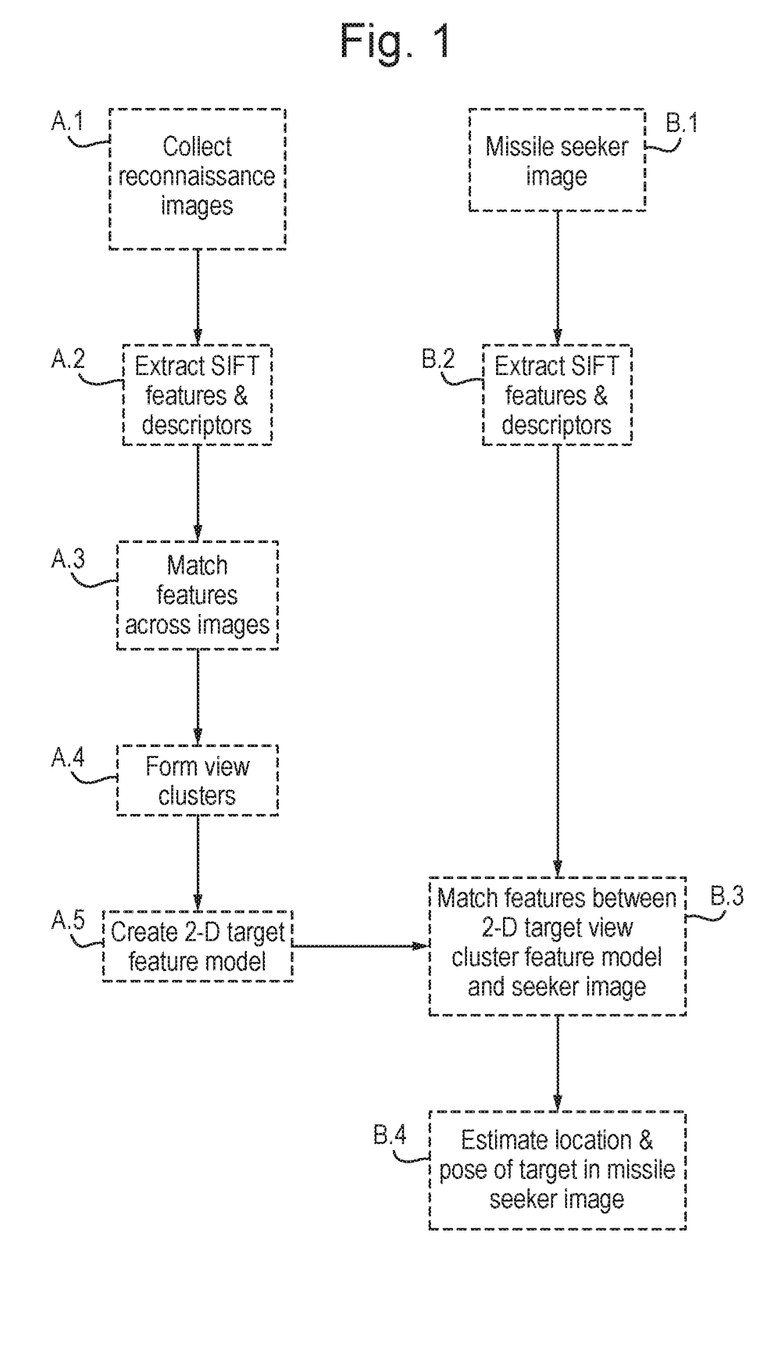
FIG. 1 is a flowchart showing steps of an example of a method according to the invention.

A flowchart describing a first example method is shown in FIG. 1. In a model-creation phase, reconnaissance images of the target are collected from a plurality of (preferably overlapping) viewpoints (step A1). SIFT features and descriptors are extracted from the images (step A2), as a means to find visual correspondences between the reference images of the target and the seeker image of the target scene. However, first the SIFT features are matched across the reconnaissance images (step A3). That enables the formation of view clusters (step A4); in this step, a smaller number of key images are enhanced by inclusion of SIFT points from neighbouring images. The view cluster images thereby each provide a "summary" of a plurality of overlapping images taken from adjacent viewpoints.

Figure 2:
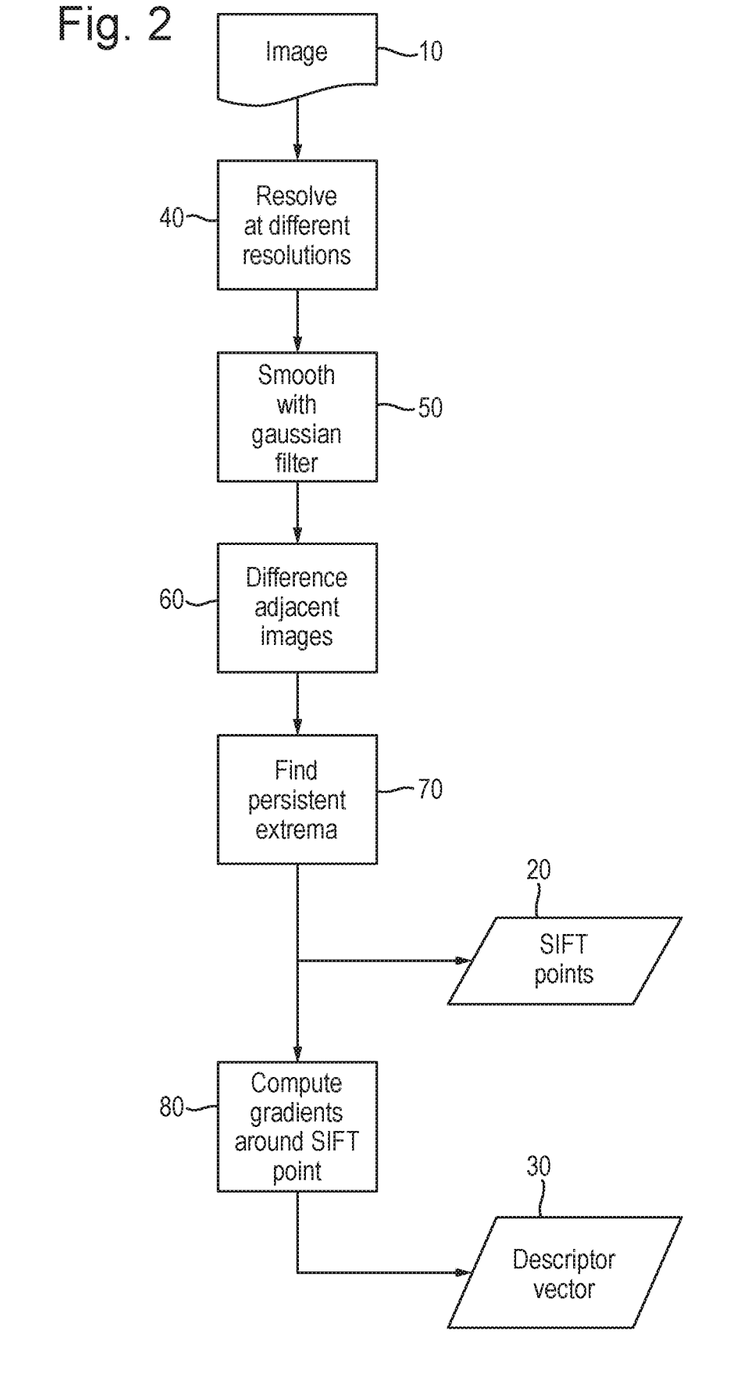
FIG. 2 is a flowchart showing a step of the method of FIG. 1 in more detail, namely extraction of SIFT features and descriptors.

In steps A2 (of the model-creation phase) and B2 (of the target identification phase), in this example, the SIFT features and descriptors are extracted by the method shown in FIG. 2. The input image 10 is a reconnaissance image and the output of the SIFT detector is a list of 2D SIFT points 20 on the image each associated to a vector of descriptors 30. These are known as keypoints and they provide a means of local image description. Each reconnaissance image is used to generate several corresponding images at different resolutions.

There are several stages to the detection of keypoints. In the first stage the image is rescaled (sub-sampled) (step 40) over several octaves and smoothed (step 50) by convolving the image with a Gaussian kernel of different widths $s=\sigma^2$, where $\sigma$ denotes the standard deviation and the variance of the Gaussian kernel. Each octave represents a single rescaling of the image at a different resolution. Within each octave s, the image is smoothed by a Gaussian kernel of different widths ($k^m\sigma$) where $k=\sqrt{2}$. The second stage involves taking the difference of Gaussians (DoG) between the rescaled images (step 60) and locating the interest points at which the DoG values are extrema with respect to both the spatial coordinates in the image domain and the scale level in the pyramid (step 70). An accurate keypoint localisation is obtained using a quadratic fit to the nearby data. Steps are then taken to eliminate points that have low contrast or occur along an edge since edge points are poorly localised. The third stage involves assigning one or more orientations to each keypoint based on local image gradients. The fourth stage involves taking the image gradients (step 80) and transforming them into a vector of feature descriptors (30) that allows for changes in local shape distortion and change in illumination.

The view clusters are used to form a target feature model (step A5).

In a target identification phase, the missile seeker generates an image (step B1). SIFT features and descriptors are extracted from the image (B2). Features are matched between the target feature mold generated in step A5 from the view clusters and the features of the seeker image (step B3). The location and pose of the target in the seeker image are estimated from the matching (step B4).

In the first stage (re-scaling) (step 40), higher resolution images are generated by replacing each pixel in the original image with several pixels in the higher-resolution image; for example, an image at twice the resolution of the original is generated by replacing each pixel in the original image with a square array of four identical pixels in the higher-resolution image. Lower resolution images are generated by removing pixels. For example, an image at half the resolution of the original is generated by removing three out of every four pixels in each square array of pixels in the original image. In this example, images are generated at two-times, one-half times and one-quarter times the resolution of the original image.

All image are smoothed using a Gaussian kernel (step 50). The Gaussian kernel is represented as $$G(x,y;s) = \frac{1}{2\pi s} e^{-(x^2+y^2)/(2s)}$$

where s represents the width $s=\sigma^2$. Each rescaling generates a subsampled image in the image pyramid known as the SIFT scale space image representation. This consists of N octaves defined by two parameters s and G. Let f be the input image. Each octave is an ordered set of s+3 images such that $$L(x,y;k^m\sigma) = G(x,y;k^m\sigma) * f_i(x,y), k=\sqrt{2}$$

where L(.) is the convolved image, G(.) is the Gaussian kernel, $f_i$, the ith sub-sample of f, m=0, 1, . . . , s+2 and i=1, . . . , N.

The second stage is to take pixel-by-pixel differences in intensity between convolved adjacent images producing the difference-of-Gaussians in each octave of scale space (step 60). Mathematically, this is represented by the Difference-of-Gaussians operator DoG as $$DoG(x,y;s) = L(x,y;s+\Delta s) - L(x,y;s)$$

In this example, that is the differences between (i) the original image and the double resolution image, (ii) the original image and the smoothed half-resolution image, and (iii) the smoothed half-resolution image and the quarter-resolution image. This process generates difference images.

The next step is to look for extrema (step 70), that is maxima and minima, in the difference (DoG) images. An extremum is a pixel in the difference image having an intensity above a chosen threshold value (the pixel is then a maximum) or below a chosen threshold value (the pixel is then a minimum). Persistent extrema, that is extrema occurring in all or most of the difference images, are designated SIFT points 20, and their co-ordinates in the image recorded, as described in Lowe (U.S. Pat. No. 6,711,293 B1).

The location of the extrema is refined by considering a quadratic fit to nearby data. Many extrema exhibit small contrast values and these should be eliminated since they are not relevant to the description of the image. Two filters are used, one to discard the keypoints with small contrast and the other to remove points that occur along edges.

Each keypoint is now coded as a triplet (x, y, σ) whose gradient has magnitude m and orientation θ given by $$m(x, y, \sigma) = \sqrt{(L(x+1, y, \sigma) - L(x-1, y, \sigma))^2 + (L(x, y+1, \sigma) - L(x, y-1, \sigma))^2}$$

$$\theta(x, y, \sigma) = \arctan\left(\frac{L(x, y+1, \sigma) - L(x, y-1, \sigma)}{L(x+1, y, \sigma) - L(x-1, y, \sigma)}\right)$$

The third step of the algorithm is to assign orientations to the keypoints. To do this the histogram of gradient orientations is accumulated over a region about each keypoint. The gradient direction and magnitude of the Gaussian pyramid images is calculated using the formulae above (step 80). The orientation of the keypoint is located by looking for peaks in the histogram of gradient orientations. A keypoint may be assigned more than one orientation. If it is, then two identical descriptors are added to the database with different orientations. A histogram with 36 bin entries is created into which the gradient orientations are added covering the 360 degree range of orientations. Each sample is weighted by the gradient magnitude and a Gaussian weighting circular window with a σ that is 1.5 times that of the scale of the keypoint. The peaks in the orientation histogram correspond to the dominant directions of local gradients. The highest peak in the histogram is localised and a quadratic function is fit to the 3 histogram values closest to each peak to interpolate the peak position to greater accuracy.

The sampling grid is then rotated to the main orientation of each keypoint using the interpolated value of the peak in the histogram. The grid is a 4×4 array of 4×4 sample cells of a 8 bin orientation histogram. Each bin in the histogram corresponds to 8 "compass directions" N, NE, etc. Taken together, the local histograms computed at all the 4×4 grid points and with 8 quantised directions lead to a feature descriptor vector with 128 entries. This resulting descriptor is referred to as the SIFT descriptor 30.

The histogram of gradient orientation samples is also weighted by the gradient magnitude and a Gaussian filter with a standard deviation of ½ the feature window size. To avoid boundary effects, each sample is accumulated into neighbouring bins weighted by a factor (1−d) in all dimensions, where d is the centre of the bin measured in units of bin spacing.

The resulting descriptor vector is normalised to a unit vector by dividing all entries by the magnitude of the vector. This makes the descriptor insensitive to moderate changes in illumination.

So, in this example, the output of the extraction of SIFT features and descriptors is a location (x,y) for each SIFT point 20 and a 128-value descriptor vector 30 associated with the SIFT point 20. The SIFT point 20 locations and descriptor vectors 30 for all available reconnaissance images are stored in a database.

The SIFT points 20 and associated descriptor vectors 30 can be used directly to match a seeker image with a known target image, but in this example the number of target images is reduced by forming clusters of views. Specifically, one of the surveillance images is chosen as a reference image and all the all of the other surveillance images are matched to that reference image (i.e. the SIFT points in each surveillance image are matched to the SIFT points in the reference image) (step A3). This process is repeated with other selected reference images. The reference images are selected so as to give distinct views of the target, e.g. views from front, rear and each side, with images that provide views in intermediate directions being combined with the nearest reference image.

In the matching process (FIG. 3), which operates on the SIFT points 20 and descriptors 30 of the surveillance images 100 (step 110), a pair of images are selected, being the reference image and one of the other surveillance images. Each SIFT point in the reference image and each SIFT point in the neighbouring view images is selected (steps 120, 130). Each SIFT point in the reference image is matched with every other point in the neighbouring view and vice versa (step 140). The selected SIFT points are compared with each other by measuring the separation of their descriptor vectors, in a method described below. The method is repeated for all of the other SIFT points in the pair of images (loop 150), i.e. all of the SIFT points in the first image are compared with all of the SIFT points in the second image. The output of the process is a matrix of SIFT point comparisons 160, with the (n, m)th entry in the matrix being the value arrived at by the comparison of the nth SIFT point in the first image with the mth SIFT point in the 2nd image.

Figure 3:
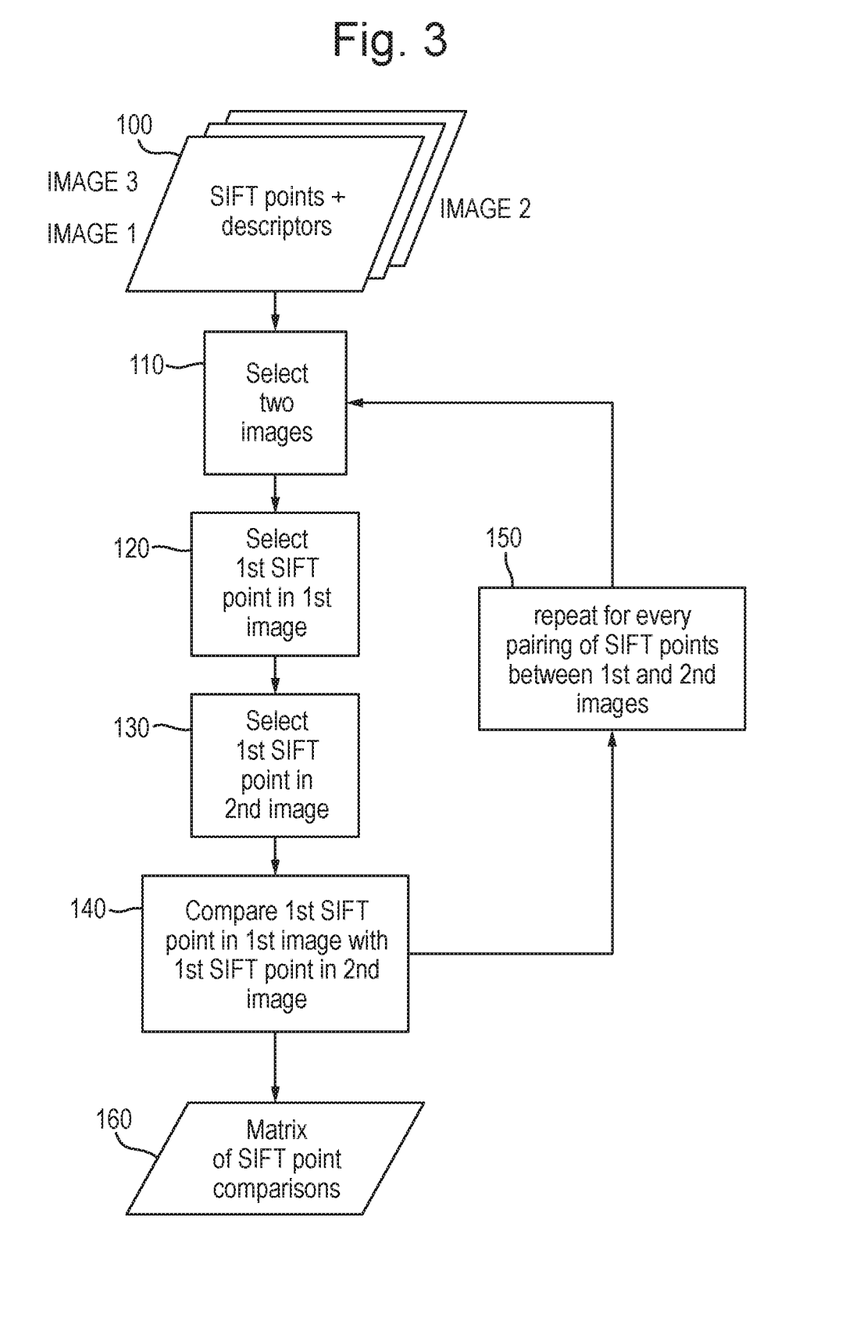
FIG. 3 is another step of the method of FIG. 1, namely matching features between images.

The comparison between the two selected SIFT points is, in this example, a measurement of the Euclidean distance between their descriptor vectors, the distances being weighted by a Gaussian weighting function. As is well known in the art, the Euclidean distance between two three-dimensional vectors is the square root of the sum of the squares of the difference between corresponding components of the vectors, e.g. the distance between vectors $$x = \begin{pmatrix} x_1 \\ x_2 \\ x_3 \end{pmatrix} \text{ and } y = \begin{pmatrix} y_1 \\ y_2 \\ y_3 \end{pmatrix} \text{ is } \sqrt{(y-x)\cdot(y-x)} = \sqrt{\sum_{i=1}^{i=3}(y_i - x_i)^2}$$

Applying a Gaussian weighting function has been found to give better results than a simple Euclidean distance for low resolution images. A Gaussian weighting gives a higher weighting to vectors that are reasonably close together but a lower weighting to vectors that are significantly far apart. Thus, with the Gaussian weighting, the distance between the descriptor vectors is given by a proximity matrix:

$$G_{i,j} = \exp\left(\frac{-\sum_{k=1}^{k=128}(x_{j,k}-x_{i,k})^2}{2\sigma^2}\right)$$

Where $x_{j,k}-x_{i,k}$ is the difference between the kth component of the jth descriptor vector and the kth component of the ith descriptor vector and σ is a parameter controlling the degree of interactions between the features.

So $G_{i,j}$ gives the weighted Euclidean distance between every pairing of SIFT point descriptor vectors. A good match exists where the distance is small, in both directions (i.e. $G_{i,j} \cong G_{j,i}$ is small). Such good matches can be found by calculating the singular value decomposition (SVD) of the matrix, that is, factorising the matrix $G=G_{i,j}$ as $G=VDU^T$ where D is a diagonal matrix, and calculating a new correspondence matrix P by converting D to a companion matrix E where each diagonal element $D_{i,i}$ is replaced with a 1 and $P=VEU^T$. If $P_{i,j}$ is the largest element in its row and the largest element in its column then there is regarded as being a one-to-one correspondence between the two features to which it relates, i.e. the ith feature in the first image and the jth feature in the second image are declared to be a good match.

This comparison thereby results in a list of matching SIFT points in the two images. The process of FIG. 3 is repeated for every pairing of the reference image with surveillance images (step 150).

Returning to FIG. 1, in the model-creation phase, next a view cluster is formed (step A4) by adding to the reference image all SIFT points that are found in at least one other surveillance image and are in the field of view of the reference image but are not themselves in the reference image. To do that, for each pairing of a reference image with an adjacent surveillance image, the relationship between the views of the images is established by calculating the similarity transform (i.e. translation, rotation and/or stretch about the image centre) that maps the location of SIFT points in the first image to the location of the SIFT points in the second image with a best fit. Such similarity transforms can readily be calculated by the skilled person. The cluster is then formed by adding to the reference image any SIFT points from surveillance images that the similarity transform maps onto the reference image but that are not already on the reference image.

Thus, the set of surveillance images is reduced to a smaller set of key reference images that have been enhanced by adding SIFT points from the other, non-reference, surveillance images. The seeker images can be compared with that reduced set of reference images, rather than all of the surveillance images, which reduces processing requirements, for example in the missile, which as discussed above will typically have only limited resources.

A target feature model is formed (step A5) by collating the location and descriptor vector information of the SIFT points in the reference images.

That completes the first phase of the method, which provides the target feature model.

When a target is sought by a missile, the missile's seeker generates a sequence of images. Selected seeker images are matched to the reference images in the target feature model.

In a first step of that process, a missile seeker image is provided (step B1) SIFT features are located in the seeker image and descriptor vectors calculated (step B2), in the same way as is described above for the surveillance images.

The seeker images are then matched to the reference images (step B3) by, for each reference image, calculating the distance between corresponding components of the descriptor vectors for each pairing of SIFT points between the seeker and reference images. The distance is calculated as the Gaussian weighted Euclidean distance (in the same way as described above for pairings of SIFT points between the surveillance images). The result is a matrix giving the distance of each SIFT point in the seeker image from each SIFT point in the surveillance image. As before, good matches are found using SVD on the matrix to factorise the matrix and calculating a new correspondence matrix. As before, the elements that are largest in both their row and their column are regarded as indicating a one-to-one correspondence between the corresponding features in the two images.

The result of that matching process is a list of features identified as being common to both the seeker image and the reference image being processed. The next step is to estimate the location and pose of the target in the seeker image (step B4). It is almost inevitable that there will be a significant number of mismatches between the seeker image and the reference image, as there is typically a lot of data in the background of the seeker image, and so false matches are statistically very likely. These accidental mismatches are excluded by testing the matches against a statistical test of significance, e.g. a Procrustes analysis.

This method starts with two sets of points, the co-ordinates of matched points in the seeker image and the reference image. The centroid of each set is calculated, and the translation required to transform one centroid to the other centroid is calculated, eliminating changes of target position between the images. For each image, the sum of the squares of the distance of each point from the centroid is calculated, and each co-ordinate is divided by that number, eliminating any change in scale between the images. Finally, SVD is used to calculate the best-fit rotation between the two sets of points, in a manner well known to the skilled person. The similarity transform (translation, scaling and rotation) that best fits one set of points to the other is thus determined.

An error is calculated for each pair of matched SIFT points by applying the similarity transform to one of the pair of points. The distance of the (co-ordinates of the) transformed point from the other, matched, point of the pair is calculated. If the transformed point is close to the matched point then the similarity transformation is a good description of the relationship between the points; however, If the matching points in the two views cannot be related by a similarity transform they are excluded from consideration as they are likely to be background points. Thus, pairs of points for which the error is larger than a preselected threshold distance are discarded.

The remaining matched SIFT points are then used to assist detecting, locating and recognising the target in the seeker image. For example, the matched SIFT points can be highlighted in the seeker image as a potential target and presented to an operator or automatic target identification may be carried out before an operator takes a final decision as to the correct course of action.

While the present disclosure has been described and illustrated with reference to particular embodiments, it will be appreciated by those of ordinary skill in the art that the disclosure lends itself to many different variations not specifically illustrated herein.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. A method of targeting a missile, the method comprising: receiving a plurality of images of a target taken from a plurality of viewpoints; extracting from the plurality of images of the target characteristic features of the target; providing data representing the characteristic features extracted from the plurality of images of the target to the missile; obtaining images of an environment of the missile, using an imager included in the missile; and using the characteristic features to identify the target in the obtained images of the environment.

2. The method as claimed in claim 1, wherein the plurality of viewpoints are overlapping viewpoints.

3. The method as claimed in claim 1, wherein the characteristic features are regions of the target which in the images of the target provide a change in contrast greater than a selected threshold value.

4. The method as claimed in claim 1, wherein the characteristic features are identified using a scale-invariant feature transform algorithm.

5. The method as claimed in claim 1, wherein the identification of the characteristic features includes the step of generating rescaled versions of at least one of the images of the target.

6. The method as claimed in claim 5, wherein the identification of the characteristic features includes the step of smoothing the rescaled image versions.

7. The method as claimed in claim 6, wherein the identification of the characteristic features includes the step of calculating difference images between the smoothed, rescaled image versions.

8. The method as claimed in claim 7, wherein the identification of the characteristic features includes the step of finding extrema in the difference images.

9. The method as claimed in claim 8, wherein the identification of the characteristic features includes the step of assigning an orientation to each extremum.

10. The method as claimed in claim 8, wherein the identification of the characteristic features includes the step of generating a vector describing the extrema, comprising the orientation of the extrema.

11. The method as claimed in claim 1, further comprising matching characteristic features across two or more of the plurality of images.

12. The method as claimed in claim 11, wherein the matching includes assessing the quality of the match against a statistical significance test.

13. The method according to claim 12, further comprising:
    selecting a reference image and one or more other images from the plurality of images;
    matching characteristic features in the one or more other images to characteristic features in the reference image;
    adding to the reference image, further, unmatched, characteristic features from the one or more other images that have not been previously identified as characteristic features in the reference image.

14. The method as claimed in claim 1, further comprising forming a view cluster including characteristic features from two or more of the corresponding images.

15. The method as claimed in claim 14, further comprising creating a model of the target from the characteristic features in the view clusters.

16. The method as claimed in claim 1, wherein the imager included in the missile is a seeker.

17. The method as claimed in claim 1, further comprising identifying characteristic features of the target in the images of the environment of the missile.

18. The method as claimed in claim 17, further comprising matching the characteristic features in the other images of the environment of the missile to characteristic features in one or more of the images of the target or view clusters or a target model.

19. The method as claimed in claim 1, further comprising estimating the location and pose of the target in the images of the environment of the missile.

20. A method of targeting a missile, the method comprising: causing the missile to receive data representing characteristic features of a target, the characteristic features having been extracted from a plurality of images of the target taken from a plurality of viewpoints; the missile obtaining images of an environment of the missile using an imager included in the missile and identifying the target in the obtained images of the environment, using the characteristic features.

21. A missile comprising: a telecommunications receiver for receiving data representing characteristic features of a target, the characteristic features having been extracted from a plurality of images of the target taken from a plurality of viewpoints; an imager for obtaining images of the environment of the missile; a data processor configured to identify, using the characteristic features, the target in the images of the environment of the missile obtained from the imager.

* * * * *